(12) United States Patent
Werner et al.

(10) Patent No.: US 8,695,423 B2
(45) Date of Patent: Apr. 15, 2014

(54) MEASURING INSTRUMENT HOUSING WITH A DISPLAY PANEL

(71) Applicant: KROHNE Messtechnik GmbH, Duisburg (DE)

(72) Inventors: Thomas Werner, Viersen (DE); Wilhelm Luebbers, Borger (DE)

(73) Assignee: KROHNE Messtechnik GmbH, Duisburg (DE)

( * ) Notice: Subject to any disclaimer, the term of this patent is extended or adjusted under 35 U.S.C. 154(b) by 0 days.

(21) Appl. No.: 13/674,343

(22) Filed: Nov. 12, 2012

(65) Prior Publication Data
US 2013/0255375 A1   Oct. 3, 2013

(30) Foreign Application Priority Data
Mar. 30, 2012 (DE) .......................... 10 2012 006 422

(51) Int. Cl.
*G01D 11/24* (2006.01)
*G01L 19/14* (2006.01)
*G01P 1/02* (2006.01)

(52) U.S. Cl.
USPC .......................................................... 73/431

(58) Field of Classification Search
USPC .......................................................... 73/431
See application file for complete search history.

(56) References Cited

U.S. PATENT DOCUMENTS

| | | | | |
|---|---|---|---|---|
| 5,396,796 A | * | 3/1995 | Kotani et al. | 73/431 |
| 5,952,803 A | * | 9/1999 | Canada et al. | 318/558 |
| 6,028,770 A | | 2/2000 | Kerner et al. | |
| 6,119,524 A | * | 9/2000 | Kobold | 73/727 |
| 6,737,855 B2 | * | 5/2004 | Huber et al. | 324/156 |
| 7,038,864 B2 | * | 5/2006 | Rose | 359/819 |
| 7,555,948 B2 | * | 7/2009 | Wiese et al. | 29/592.1 |
| 7,614,357 B2 | * | 11/2009 | Hernandez et al. | 116/305 |
| 2011/0011180 A1 | * | 1/2011 | Wilson | 73/431 |
| 2012/0272729 A1 | * | 11/2012 | Arai et al. | 73/431 |

FOREIGN PATENT DOCUMENTS

| | | |
|---|---|---|
| AT | 507 519 B1 | 11/2012 |
| DE | 27 26 851 A1 | 12/1978 |
| DE | 40 36 994 A1 | 5/1992 |
| DE | 40 41 067 A1 | 7/1992 |
| DE | 197 55 765 A1 | 6/1999 |
| DE | 103 45 570 A1 | 4/2005 |

\* cited by examiner

*Primary Examiner* — Lisa Caputo
*Assistant Examiner* — Jamel Williams
(74) *Attorney, Agent, or Firm* — Roberts Mlotkowski Safran & Cole, P.C.; David S. Safran (57) ABSTRACT

An intrinsically safe housing for a measuring instrument, having a viewing window for the display panel of a measuring instrument, an instrument display panel holding fixture for receiving an instrument display panel provided around the viewing window, said holding fixture having an inner void having a volume greater than a volume of the instrument display panel, a difference between said volumes forming a resin slot surrounding the instrument display panel upon its insertion, and a seal holding fixture provided around the viewing window containing a seal for sealing a front surface of said display panel, wherein the seal and the display panel holding fixture form a resin receptacle for a flowable resin, and the resin slot receives an overflow of said resin upon insertion of said instrument display panel.

20 Claims, 6 Drawing Sheets

Fig. 7

MEASURING INSTRUMENT HOUSING WITH A DISPLAY PANEL

BACKGROUND OF THE INVENTION

1. Field of the Invention

The invention relates to a measuring instrument housing having a viewing window, a display panel holding fixture being provided around the viewing window, a display panel on a measuring instrument that can be inserted in the display panel holding fixture, a seal for creating a seal with resin between the display panel when inserted in the display panel holding fixture and the display panel holding fixture, a seal holding fixture provided around the viewing window in the display panel holding fixture for holding the seal, and a circumferential resin slot provided between the display panel and the display panel holding fixture.

2. Description of Related Art

Measuring instrument housings serve to accommodate measuring instruments that measure, e.g., a process variable such as the flow of a medium through a tube. A measuring instrument generally includes mechanical, electrical and electronic components and often also displaying devices, which, e.g., display the flow or status information. A viewing window is provided on the measuring instrument housing for reading displaying devices, the display elements being visible through the viewing window.

Often, a measuring instrument housing is intended to isolate the inner area containing the measuring instrument from the outer area, in order to avoid damage to the measuring instrument caused by surrounding influences. For this purpose, the viewing window can have a surrounding display panel holding fixture, in which a display panel is inserted, so that the displaying elements are visible through the viewing window and the outer space is isolated from the inner space. The seal between the display panel and the display panel holding fixture can be implemented using a ring-shaped seal, for example, with a circular cross-section, for which the display panel holding fixture around the viewing window is provided. The inserted display panel lies on the seal, so that the inner area of the measuring instrument housing and the outer area are hermetically separated from one another. The display panel can be fixed in the display panel holding fixture using outer threading, which is screwed onto threading provided in the display panel holding fixture and pushes the display panel against the seal.

If the measuring instrument is used in an atmosphere at risk of explosion and the measuring instrument is not intrinsically safe, then the measuring instrument housing can be formed pressure-proof according to standard DIN EN 60079-1. A measuring instrument is not intrinsically safe when it can ignite an explosive atmosphere. The ignition can, e.g., occur due to hot surfaces or due to energy stores that are not protected. A pressure-proof encapsulated measuring instrument housing is thus capable of withstanding the increased pressure in the inner area of the measuring instrument housing that occurs during an explosion of the explosive atmosphere, and of avoiding transfer of the explosion to the atmosphere surrounding the housing. In particular, it is essential for a pressure-proof encapsulation according to standard DIN EN 60079-1 that ignition-proof gaps are formed between the outer area and the inner area in the measuring instrument housing.

Such a gap is provided between the display panel and the display panel holding fixture, which is to be ignition-proof. One possibility for ignition-proof design of this gap is filling of the gap with a resin, referred-to as a resin slot below. Normal widths of resin slots lie in the range of 0.5 mm to 3 mm. The suitable viscosity of the resins used lies in the range of about 100 mPa·s to about 12,000 mPa·s. The resin is inserted in the resin slot and flows out in the resin slot due to the influence of gravity, wherein the seal prevents the liquid resin from leaking to the outside of the measuring instrument housing. The width of the resin slots in conjunction with the viscosities of the resins account for a merely low flow velocity of the resin in the resin slot and for the risk of entrapment of air bubbles in the resin, which can impair the ignition-proof safety. The entrapment of air bubbles in the resin can be avoided by evacuating the area before filling. However, the evacuation of the area goes hand in hand with extensive technical effort and thus accompanying costs. Visual inspection of the resin is not efficiently possible due to the given spatial relations in the measuring instrument housing. In order to still guarantee an ignition-proof design of the resin slots, a large as possible resin thickness is pursued in the resin slot. However, this goes hand in hand with the risk of contaminating the inside of the measuring instrument housing or the display panel.

SUMMARY OF THE INVENTION

The primary object of the present invention is thus to provide a measuring instrument housing with improved resin sealing.

The measuring instrument housing according to the invention, in which the above derived and shown object is met, is initially and essentially characterized in that a seal disposed within a seal holding fixture and a display panel holding fixture are provided around a viewing window for receiving an instrument display panel, and form a resin receptacle surrounding the viewing window for holding a flowable resin, such as a liquid resin, at the intended orientation of the measuring instrument housing. The display panel holding fixture has an inner void having a volume greater than the volume of the display panel to be inserted therein, and upon insertion of the display panel into the holding fixture, the difference in volumes forms a resin slot between the outer surface of the display panel and the inner surface of the holding fixture. The orientation of the measuring instrument housing is at the intended orientation when the liquid resin does not run out of the resin receptacle. Furthermore, the invention is characterized in that that the resin receptacle exhibits a first receptacle volume when the display panel has not been inserted and the resin receptacle exhibits a second receptacle volume when the display panel has been inserted, and that the first receptacle volume is a difference volume greater than the second receptacle volume. If the first receptacle volume is not completely filled with resin, then the difference volume is the volume of the resin filled in the resin receptacle minus the second receptacle volume. Additionally, the invention is characterized in that the difference volume is the overflow in the resin slot when the display panel has been inserted.

In measuring instrument housings from the prior art, when the resin is introduced it flows from top to bottom in the resin slot, due to gravity, which can lead to the entrapment of air bubbles, which can negatively influence the sealing quality of the resin. In contrast, for the measuring instrument housing according to the invention the liquid resin in the resin receptacle rises from bottom to top in respect to gravity, and is forced into the resin slot during the insertion of the display panel. Accordingly, air bubbles are not created that could be entrapped in the resin, and since there are no air bubbles in the resin, reject measuring instrument housings due to unsatisfactory resin seals are reduced.

In a very particularly preferred design of the invention, the inserted display panel, which has a volume lies on the seal and deforms the seal in such a manner that the resin receptacle exhibits the second receptacle volume, i.e. by forcing the resin to flow upward into the resin slot. The change of the resin receptacle volume occurs, thus, directly due to deformation of the seal during the insertion of the display panel in the display panel holding fixture. Recesses are provided in the display panel holding fixture, so that the resin can overflow out of the resin receptacle into the resin slot, formed in the void between the outer surface of the display panel and the inner surface of the display panel holding fixture.

The inserted display panel can, in this way, be arranged in the display panel holding fixture in such a manner that the display panel is sealed against the viewing window, but not in direct contact with the display panel holding fixture, rather only has indirect contact with the display panel holding fixture via the seal and the surrounding resin. In this manner, mechanical forces due, for example, to different temperature coefficients of the display panel and the measuring instrument can be accommodated by the hardened resin. Naturally, the resin is selected to have a sufficient elasticity even in the hardened state for this purpose. The mechanical forces, consequently, cannot damage either the housing or the display panel.

The liquid resin is filled into the resin receptacle before inserting the display panel into the display panel holding fixture. In order to measure the amount of resin filled, one or more observable markings can be provided on the seal and/or on the display panel holding fixture. The difference volume of the resin that has overflowed into the resin slot from the resin receptacle due to insertion of the display panel is exactly measured with the help of the markings so that the resin slot is filled. Thus, contamination of the inside of the measuring instrument housing or the display panel due to amounts of resin that are too large are eliminated. The risk of having an amount of resin that is not enough is also eliminated.

The width of the resin slots can further be between about 0.5 mm and about 3 mm, however thinner or wider resin slots can also be provided. Also, resins having a viscosity between about 100 mPa·s and about 12,000 mPa·s can further be used. A change in the existing production process is, thus, not necessary. Of course, resins having other viscosities can also be used.

In a further preferred design of the invention, the seal has a seal base and a deformable structure, wherein the seal base is adapted in shape to the seal holding fixture and the deformable structure is deformed when the display panel has been inserted. Preferably, the seal holding fixture holds the seal base in a twist-proof manner, meaning that twisting of the seal inserted in the seal holding fixture upon insertion of the display panel is prevented by the spatial design and adaptation of the seal base on the seal holding fixture. Preferably, materials for the seal include elastomers and/or compressible foams. The use of these materials allows for a low-cost and simple production of the seals.

In a further preferred design of the invention, the resin that flowed over and hardened in the resin slot acts to mechanically fix the display panel into the display panel holding fixture. Alternatively or in addition, mechanical fixing can be carried out, for example, using an outer thread screwed onto an inner thread provided in the display panel holding fixture, which pushes the display panel against the seal. Additionally, the resin that flowed over and hardened in the resin slot can form an ignition-proof or flame-proof resin slot and therefore housing according to the standard DIN EN 60079-1.

In detail there are various possibilities for further developing and designing the measuring instrument housing according to the invention. To this end, reference is made to the following detailed description of the invention, in connection with the drawings.

DETAILED DESCRIPTION OF THE INVENTION

Figure 1:
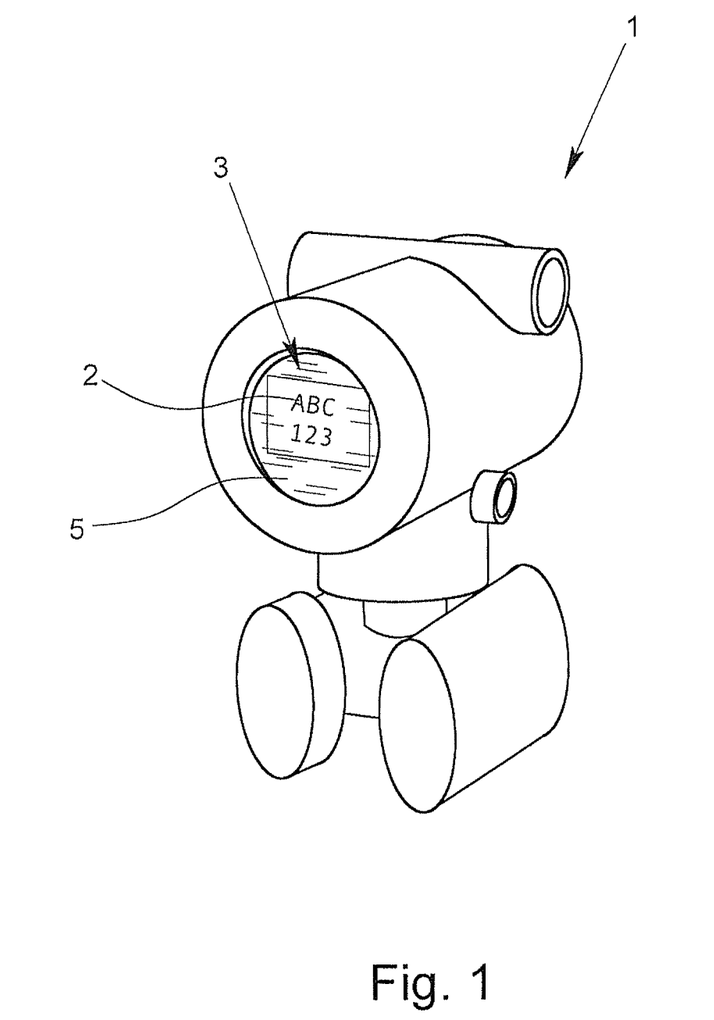
FIG. 1 shows a first embodiment of the measuring instrument housing according to the invention in a perspective view.

FIG. 1 shows a measuring instrument housing 1 according to the invention. A measuring instrument is situated in the measuring instrument housing 1, the measuring instrument including a display panel 2 for displaying variables measured by the measuring instrument and for displaying status information of the measuring instrument. A viewing window 3 is provided in the measuring instrument housing 1 for visibility of the display panel 2. The measuring instrument itself is not intrinsically safe according to the standard DIN EN 60079-1. Thus, it can ignite an explosive atmosphere. However, since the measuring instrument might be used in an explosive atmosphere, the measuring instrument housing 1 is pressure-proof according to the standard DIN EN 60079-1. That means that the measuring instrument housing 1 can withstand the pressure resulting from an explosion of an explosive atmosphere in the inner area of the measuring instrument housing 1 and prevents a transfer of the explosion to the atmosphere surrounding the measuring instrument housing 1. A display panel holding fixture 4 provided with a viewing window 3 and a display panel 5 inserted in the display panel holding fixture 4 pertain to the implementation of the pressure-proof encapsulation of the measuring instrument housing 1.

Figure 2:
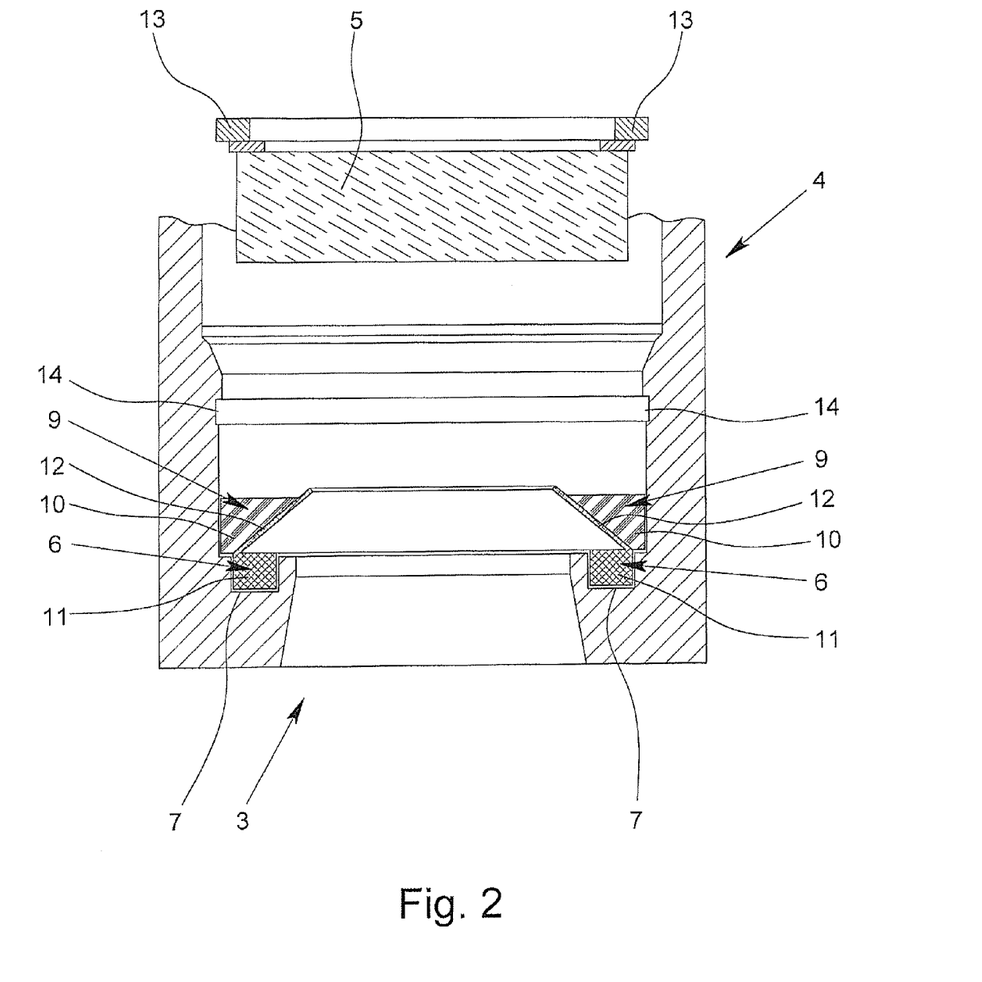
FIG. 2 is a sectional side view of the measuring instrument housing from FIG. 1 having a display panel that has not yet been inserted.

A section through the measuring instrument housing 1 showing the display panel holding fixture 4 in a sectional side view having a display panel 5 that has not yet been inserted is shown in FIG. 2. The display panel holding fixture 4 is provided around the viewing window 3. A seal 6 is arranged in a seal holding fixture 7 provided around the viewing window 3 in the display panel holding fixture 4. When the display panel 5 has been inserted in the display panel holding fixture 4, a resin slot 8 results, see FIG. 3.

Figure 3:
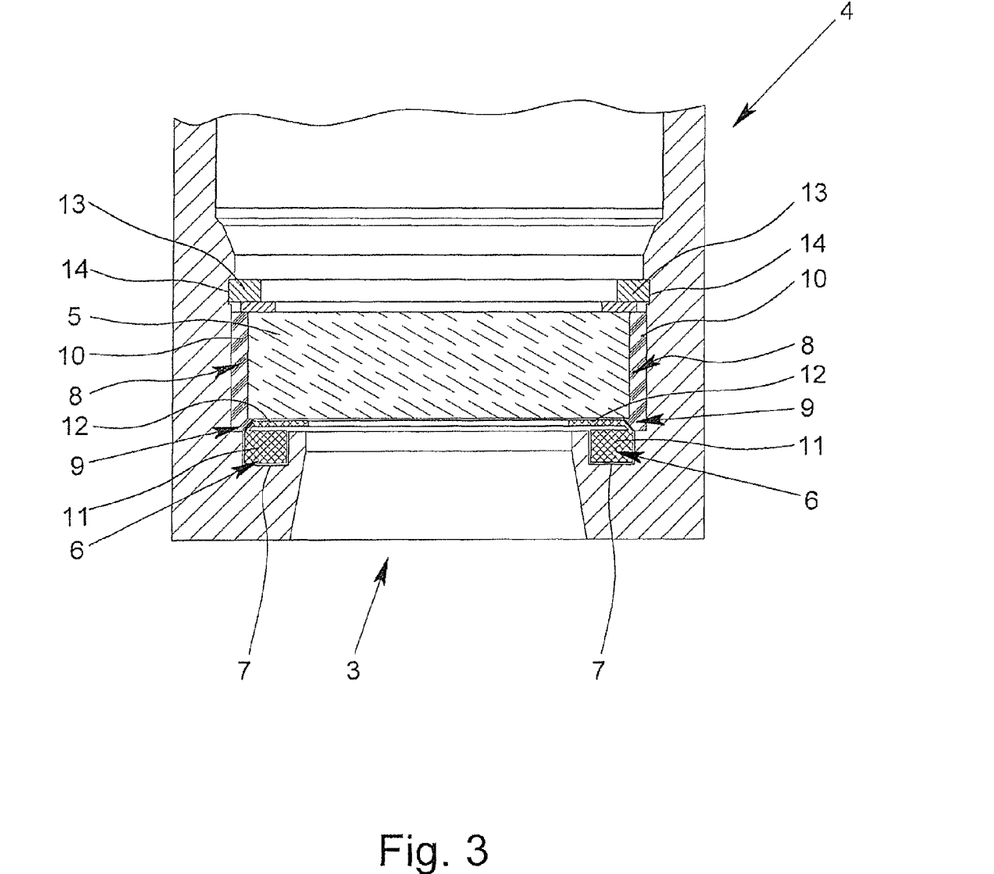
FIG. 3 shows a section of the measuring instrument housing from FIG. 2 having a display panel that has been inserted.

FIGS. 2 and 3 show that the seal 6 and display panel holding fixture 4 form a resin receptacle 9 around the viewing window 3. If the resin receptacle 9 is at the intended orientation, it is able to take in liquid resin 10. If the display panel 5 has not been inserted, see FIG. 2, the resin receptacle 9 exhibits a first receptacle volume and when the display panel 5 has been inserted, see FIG. 3, the resin receptacle 9 exhibits a second receptacle volume. It is clear, that the first receptacle volume is greater than the second receptacle volume by a difference volume. During insertion of the display panel 5 in the display panel holding fixture 4, the display panel 5 deforms the seal 6 in such a manner that the volume of the resin receptacle 9 is reduced from the first receptacle volume to the second receptacle volume. The difference volume of the resin 10 flows into the resin slot 8 during insertion. The difference volume is measured exactly so that the resin slot 8 is filled with resin 10 when the display panel 5 has been inserted, but neither the display panel 5 nor the display panel holding fixture 4 are contaminated by too much resin 10.

During insertion, the display panel 5 lies tightly against the seal 6 and prevents leaking of the liquid resin 10 through the viewing window 3. The display panel 5 inserted in the display panel holding fixture 4 does not come into direct contact with the display panel holding fixture 4. Since the resin 10 rises into the resin slot 8 and does not run into the resin slot 10 as is known from the prior art, air bubbles cannot, according to principle, be trapped in the resin 10. The resin slot 8 has a width of about 0.5 mm and the viscosity of the liquid resin 10 is about 12,000 mPa·s. Even in this extreme combination of a resin slot 8 with a narrow width and a resin 10 with a high viscosity can be applied, as opposed to the prior art, without the risk of air bubbles being trapped in the hardened resin 10.

The seal 6 includes a seal base 11 and a deformable structure 12. Only the deformable structure 12 is deformed by insertion of the display panel 5, not the seal base 11. The deformation of the deformable structure 12 occurs during insertion of the display panel 5 in the display panel holding fixture 4 and is a bending of the deformable structure 12 toward the seal base 11. The contour of the cross-section of the seal holding fixture 7 is formed to be rectangular and the seal base 11 is adapted in shape to the seal holding fixture 7 so that the seal base 11 is held in a twist-proof manner by the seal holding fixture 7 when the deformable structure 12 has been deformed by the display panel 5.

The seal 6 can be formed of an elastomer, which on the one hand gives the seal 6 the required elasticity to be reversibly deformed by the display panel 5 during insertion of the display panel 5 in the display panel holding fixture 4, and on the other hand can seal the boundary surface to the display panel 5 so that liquid resin 10 cannot be pressed out through the viewing window 3 during insertion of the display panel 5 in the display panel holding fixture 4.

FIG. 3 shows the display panel 5 inserted in the display panel holding fixture 4. The display panel 5 is mechanically fixed using a retaining ring 13, which is placed in a corresponding inner groove 14 in the display panel holding fixture 4 and pushes the display panel 5 against the seal 6. In addition to mechanical fixing using the retaining ring 13, the display panel 5 is mechanically fixed in the display panel holding fixture 4 with the resin 10 that overflowed and hardened. Furthermore, the resin slot 8 is ignition-proof according to the standard DIN EN 60079-1 due to the hardened resin 10. If explosive atmosphere found on the inside of the measuring instrument housing 1 is ignited, an explosive atmosphere located outside cannot be ignited due to the cast resin slot 8.

Figure 4:
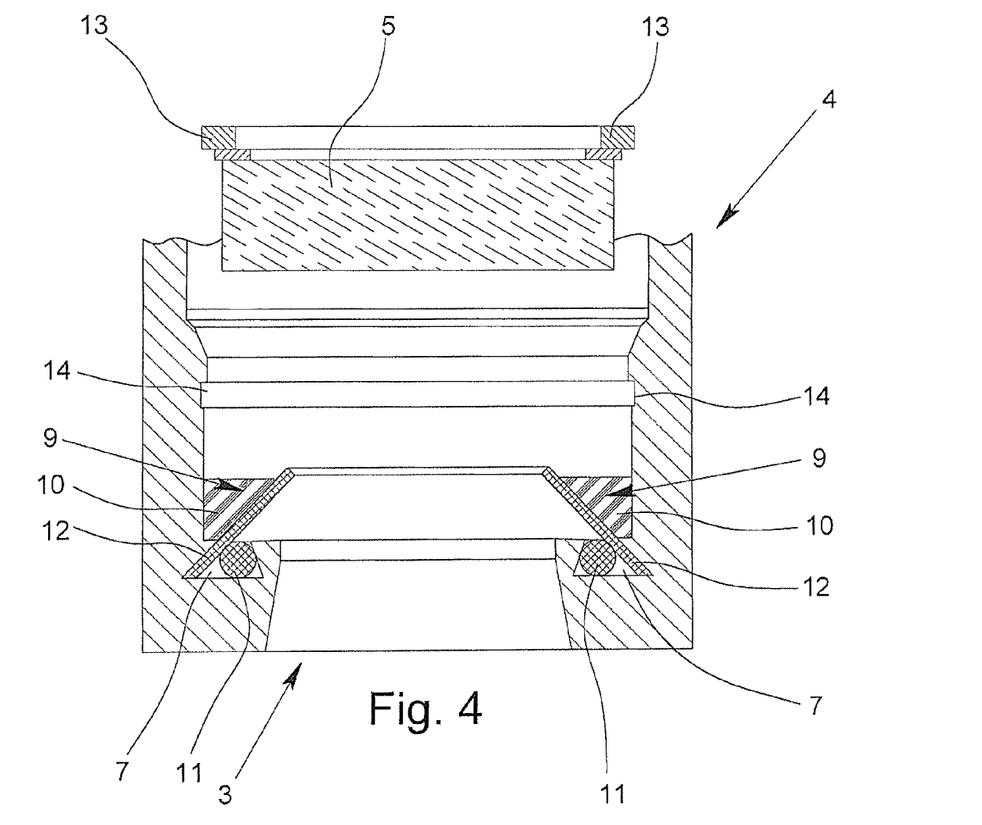
FIG. 4 is a sectional side view of a second embodiment of the measuring instrument housing according to the invention.

FIG. 4 shows a section in a sectional side view of a second embodiment of the measuring instrument housing 1 according to the invention. The second embodiment is the same as the first embodiment of the measuring instrument housing 1 according to the invention with the exception of the seal 6 and the seal holding fixture 7. In the embodiment shown in FIG. 4, the seal 6 comprises a seal base 11 and a separate deformable structure 12. The seal base 11 is a ring-shaped seal with a circular cross-section and the deformable structure 12 is a truncated cone shell having a constant material thickness. The contour of the cross-section of the seal holding fixture 7 widens with increasing depth in the seal holding fixture 7. The seal 6 is safeguarded against falling out due to this design shape of the seal holding fixture 7 in conjunction with the seal 6. In the process, the essential task of the deformable structure 12 is to seal against resin 10 leaks and the essential task of the seal base 11 is to clamp the deformable structure 12 tightly in the seal holding fixture 7. By distributing the essential tasks of the seal 6 onto two components of the seal 6, these components can be simply optimized for their task. In particular, a suitable material can be chosen for each component. For this reason, the seal base 11 can be a compressible foam for pushing the deformable structure 12 into the seal holding fixture 7, and the deformable structure 12 can again be an elastomer for sealing against leaks of liquid resin 10. Due to the dichotomy of the seal 6, production is possible in a particularly easy manner.

Figure 5A:
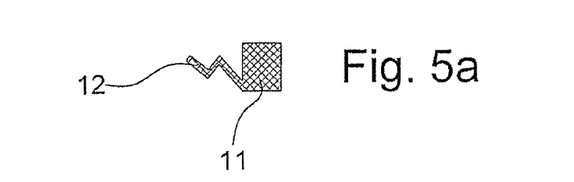
FIGS. 5a and 5b shows two further embodiments of seals of the measuring instrument housing according to the invention.
Figure 5B:
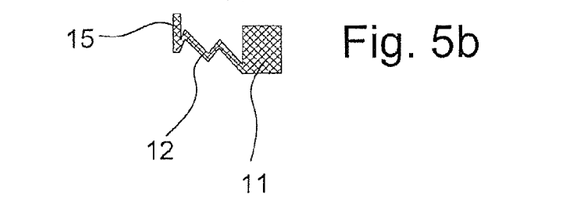

FIGS. 5a and 5b show two further embodiments of the seal 6. The seal base 11 of the seal 6 has a rectangular cross-section in FIG. 5a, like the seal base 11 of the seal 6 in FIGS. 2 and 3. However, the cross-section of the deformable structure 12 is no longer straight, but jagged. Due to the jagged cross-section of the deformable structure 12, the deformable structure 12 is no longer bent toward the seal base 11 during insertion of the display panel 5 in the display panel holding fixture 4, but compressed corresponding to the jags instead, which reduces the required space of the seal 6. FIG. 5b shows a further development of the seal 6 from FIG. 5a, in which an additional sealing lip 15 provides for a better seal to the display panel 5.

Figure 6:
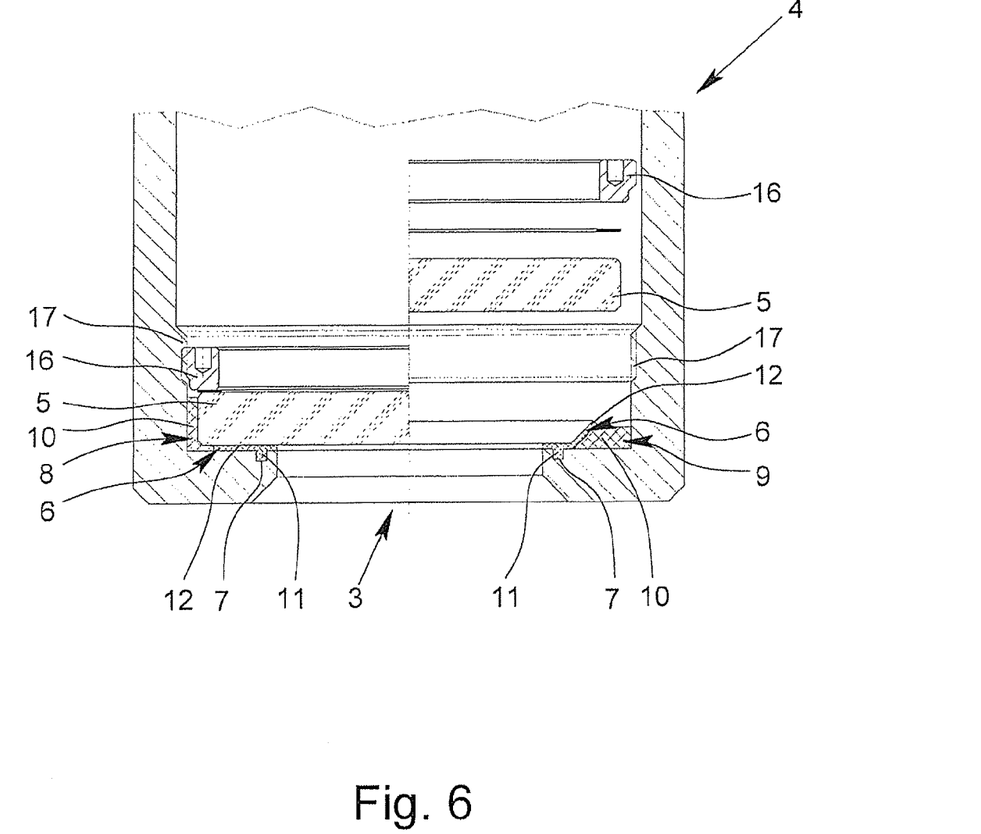
FIG. 6 is a sectional side view of a third embodiment of the measuring instrument housing according to the invention.

FIG. 6 shows a section in a sectional side view of a third embodiment of the measuring instrument housing 1 according to the invention with a display panel 5 inserted in the display panel holding fixture 4 on the left side and with a display panel 5 that is not inserted on the right side. The seal holding fixture 7 is a groove running around the viewing window 3 having a rectangular cross section. The seal base 11 of the seal 6 is adapted in shape to the seal holding fixture 7. The seal 6 ends flush with the viewing window 3. If the display panel 5 has not been inserted, the deformable structure 12 of the seal 6 is initially bent within the display panel holding fixture 4. If the display panel 5 has been inserted, the deformable structure 12 lies flat on the display panel holding fixture 4. In this manner, a particularly large sealing area results between display panel holding fixture 4 and display panel 5 due to the seal 6. The display panel 5 is mechanically fixed by an outer threaded ring 16, which is screwed onto a corresponding inner thread 17 in the display panel holding fixture 4 and which pushes the seal 6 against the display panel 5.

Figure 7:
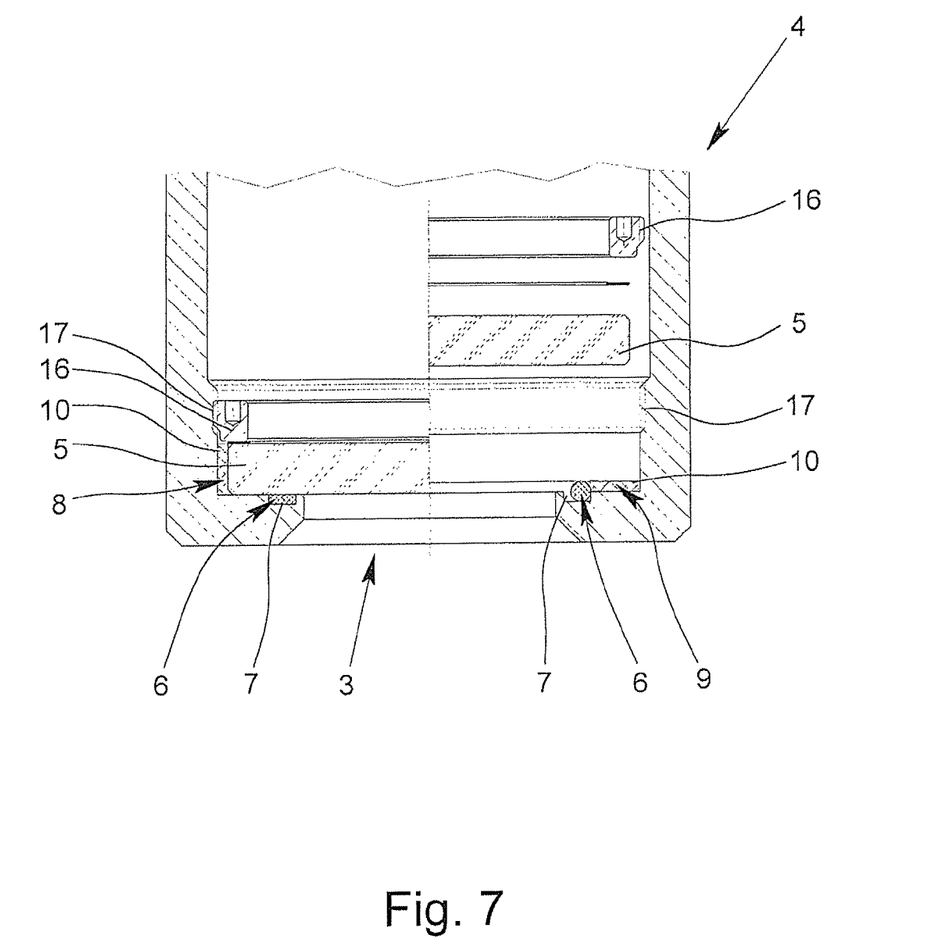
FIG. 7 is a sectional side view of a fourth embodiment of the measuring instrument housing according to the invention.

FIG. 7 shows a section in a sectional side view of a fourth embodiment of the measuring instrument housing 1 according to the invention. On the left side, the display panel 5 has been inserted and on the right side, the display panel 5 has not been inserted. The seal holding fixture 7 is a groove with a rectangular cross-section, milled around the viewing window 3. The seal 6 is a ring-shaped seal with a circular cross-section. The volume and the elasticity of the seal 6 are measured in such a manner that display panel 5 inserted in the display panel holding fixture 4 pushes the seal 6 in the seal holding fixture 7 so that the display panel 5 lies against the display panel holding fixture 4 and the seal 6 fills the seal holding fixture 7.

What is claimed is:

1. An intrinsically safe housing for a measuring instrument, comprising:
   a viewing window;
   an instrument display panel holding fixture for receiving an instrument display panel, provided around the viewing window, said holding fixture having an inner void having a volume greater than a volume of the instrument display panel to be inserted therein, a difference between said volumes forming a resin slot surrounding the instrument display panel in an inserted position of the instrument display panel; and
   a seal holding fixture provided around the viewing window containing a seal for sealing a front surface of said display panel;
   wherein the seal and the display panel holding fixture form a resin receptacle for a flowable resin, and wherein the resin slot is adapted to receive an overflow of said resin upon insertion of said instrument display panel.

2. The housing according to claim 1, further comprising a deformable structure surrounding the viewing window which further defines the resin receptacle and is designed to deform when the instrument display panel is received.

3. The housing according to claim 1, wherein the resin receptacle exhibits a first receptacle volume when the display panel has not been inserted and a second receptacle volume when the display panel has been inserted, said difference in volumes corresponding to a volume of resin overflow in said resin slot.

4. The housing according to claim 1, wherein seal is adapted to support the instrument display panel upon insertion thereof into the housing, and wherein the seal is deformable in such a manner that the flowable resin in the resin receptacle is forced into the resin slot upon insertion of the instrument display panel.

5. The housing according to claim 1, wherein the seal has a seal base adapted in shape to the seal holding fixture.

6. The housing according to claim 1, wherein the seal holding fixture holds the seal base in a twist-proof manner.

7. The housing according to claim 1, further comprising at least one observable marking on the seal for measuring at least one quantity of flowable resin when the instrument display panel is not inserted.

8. The housing according to claim 1, further comprising at least one observable marking on the display panel holding fixture for measuring at least one quantity of flowable resin when the instrument display panel is not inserted.

9. The housing according to claim 1, wherein upon insertion of the instrument display panel, the instrument display panel and the display panel holding fixture are not in direct contact.

10. The housing according to claim 1, wherein the seal comprises an elastomer.

11. The housing according to claim 1, wherein the seal comprises a compressible foam.

12. The housing according to claim 1, wherein the resin in the resin slot acts to mechanically fix the instrument display panel into the display panel holding fixture.

13. The housing according to claim 1, wherein the housing is flame-proof according to DIN EN 60079-1 upon hardening of the overflow resin in the resin slot.

14. The housing according to claim 1, wherein the resin slot exhibits a width between about 0.5 mm and about 3 mm.

15. The housing according to claim 1, wherein the viscosity of the flowable resin is between about 100 mPa·s and 12,000 mPa·s.

16. An intrinsically safe measurement unit, comprising:
   a measuring instrument having a display panel,
   a viewing window;
   an instrument display panel holding fixture provided around the viewing window for holding the display panel of said measuring instrument, said holding fixture having an inner void with a volume greater than a volume of the display panel, a difference between said volumes forming a resin slot surrounding the instrument display panel; and
   a seal holding fixture provided around the viewing window containing a seal for sealing a front surface of said display panel;
   wherein a flowable resin has been hardened in the resin slot.

17. The housing according to claim 16, further comprising a deformed structure surrounding and in contact with the display panel of said measuring instrument.

18. The housing according to claim 16, wherein the instrument display panel is supported on the seal and has deformed the seal in a manner that enabled the resin to have flowed into the resin slot.

19. The housing according to claim 16, wherein the instrument display panel and the display panel holding fixture are not in direct contact.

20. The housing according to claim 16, wherein the housing is flame-proof according to standard DIN EN 60079-1.

* * * * *